US010281749B2

(12) United States Patent
Yang et al.

(10) Patent No.: US 10,281,749 B2
(45) Date of Patent: May 7, 2019

(54) DISPLAY SUBSTRATE, METHOD FOR DRIVING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 38 days.

(21) Appl. No.: 15/137,791

(22) Filed: Apr. 25, 2016

(65) Prior Publication Data

US 2016/0335939 A1 Nov. 17, 2016

(30) Foreign Application Priority Data

May 13, 2015 (CN) .......................... 2015 1 0243833

(51) Int. Cl.
*G09G 3/20* (2006.01)
*G02F 1/13* (2006.01)
(Continued)

(52) U.S. Cl.
CPC ............. *G02F 1/13* (2013.01); *G09G 3/3426* (2013.01); *G09G 3/3611* (2013.01);
(Continued)

(58) Field of Classification Search
CPC ................. G02F 1/13; G02F 1/133509; G02F 1/133512; G02F 1/136209;
(Continued)

(56) References Cited

U.S. PATENT DOCUMENTS

| | | | | |
|---|---|---|---|---|
| 2011/0148948 A1* | 6/2011 | Gandhi | ................ | G02B 26/001 345/690 |
| 2011/0164067 A1* | 7/2011 | Lewis | ................ | G02B 26/0841 345/690 |
| 2013/0120688 A1* | 5/2013 | Chao | ....................... | F21V 11/00 349/62 |
| 2014/0247295 A1* | 9/2014 | Hussain | ............... | G09G 3/3611 345/691 |

(Continued)

FOREIGN PATENT DOCUMENTS

| | | |
|---|---|---|
| CN | 102768828 A | 11/2012 |
| CN | 102834859 A | 12/2012 |

(Continued)

OTHER PUBLICATIONS

First Office Action regarding Chinese application No. 201510243833.5, dated Oct. 10, 2016. Translation provided by Dragon Intellectual Property Law Firm.

*Primary Examiner* — Vinh T Lam
(74) *Attorney, Agent, or Firm* — Harness, Dickey & Pierce, P.L.C.

(57) ABSTRACT

The present disclosure relates to the field of display technology, and provides a display substrate, its driving method and a display device, so as to reduce the power consumption of the display device. The display substrate includes a plurality of first transparent regions arranged in an array form. Each first transparent region serves as a subpixel, and a pixel includes at least two adjacent subpixels. The subpixels in each pixel correspond to backlight lamps in different colors respectively. The display substrate further includes a plurality of light-shielding structures each corresponding to one of the subpixels and configured to adjust a light transmission rate of the subpixel.

16 Claims, 5 Drawing Sheets

(51) Int. Cl.
*G09G 3/34* (2006.01)
*G09G 3/36* (2006.01)

(52) U.S. Cl.
CPC ............... *G09G 2300/0426* (2013.01); *G09G 2300/0465* (2013.01); *G09G 2330/021* (2013.01)

(58) Field of Classification Search
CPC . G02F 2001/136218; G02F 2001/1351; G02F 2001/1352; G02F 2201/08; G02F 2413/07; G09G 3/3611; G09G 3/3426; G09G 2330/021; G09G 2300/0465; G09G 2300/0426; H04N 1/00997; H04N 2201/02497; H04N 2201/03166; H01L 23/5225; H01L 27/14623; H01L 29/78633; H01L 31/02162; H01L 31/02164; B81B 7/0003; B81B 7/0032; B81B 7/0035; B81B 7/0048; B81B 7/0061; B81B 7/007; B81B 7/0074; B81B 7/008; B81B 7/02; B81B 2201/10; B81B 2203/0127; B81B 2207/07; B81B 2207/99
USPC ......... 345/38, 50–51, 80, 87–93; 349/61–67, 349/87, 94, 96, 104–123, 143–147, 162
See application file for complete search history.

(56) References Cited

U.S. PATENT DOCUMENTS

| | | | | |
|---|---|---|---|---|
| 2014/0285539 | A1* | 9/2014 | Kurokawa | G09G 3/3406 345/690 |
| 2015/0260519 | A1* | 9/2015 | Boysel | G01C 19/5712 257/415 |
| 2016/0041449 | A1* | 2/2016 | Clark | G02F 1/134309 623/6.56 |
| 2016/0062179 | A1* | 3/2016 | Eguchi | G02F 1/133514 349/25 |
| 2016/0063955 | A1* | 3/2016 | Yamamoto | H03K 3/356026 345/205 |
| 2016/0109649 | A1* | 4/2016 | Ishiwata | G02B 6/0086 349/65 |
| 2016/0189645 | A1* | 6/2016 | Lee | G02F 1/13 345/206 |
| 2016/0202555 | A1* | 7/2016 | Tanaka | G02B 5/201 349/71 |
| 2016/0275881 | A1* | 9/2016 | Sugihara | G02B 26/08 |
| 2017/0011680 | A1* | 1/2017 | Miyata | G09G 3/3607 |

FOREIGN PATENT DOCUMENTS

| | | |
|---|---|---|
| CN | 102970558 A | 3/2013 |
| CN | 103163672 A | 6/2013 |
| JP | 2005070440 A | 3/2005 |
| TW | 201516548 A | 5/2015 |

\* cited by examiner

DISPLAY SUBSTRATE, METHOD FOR DRIVING THE SAME AND DISPLAY DEVICE

CROSS-REFERENCE TO RELATED APPLICATION

The present application claims a priority of the Chinese patent application No. 201510243833.5 filed on May 13, 2015, which is incorporated herein by reference in its entirety.

TECHNICAL FIELD

The present disclosure relates to the field of display technology, in particular to a display substrate, a method for driving the same and a display device.

BACKGROUND

Currently, as a conventional color display device, a liquid crystal display device includes a backlight module, an array substrate, a liquid crystal layer and a color filter substrate arranged one on another. The backlight module is configured to provide a backlight, the array substrate is configured to control deflections of liquid crystal molecules in the liquid crystal layer, and the color filter substrate is configured to selectively absorb a part of light beams and allow the other parts of light beams to pass therethrough.

The inventor finds that, there at least exist the following defects in the liquid crystal display device with the above-mentioned structure. Because a part of the light beams from the backlight module are selectively absorbed by the color filter substrate while merely a part of the light beams are allowed to pass through the color filter substrate, a light utilization rate for the liquid crystal display device is relatively low. In order to guarantee the brightness of the liquid crystal display device, the power consumption of the backlight module needs to be relatively high, and thereby the power consumption of the liquid crystal display device will be relatively high too.

SUMMARY

An object of the present disclosure is to provide a display substrate, a method for driving the same and a display device, so as to reduce the power consumption of the display device.

In one aspect, the present disclosure provides in some embodiments a display substrate including a plurality of first transparent regions arranged in an array form. Each first transparent region serves as a subpixel, and a pixel includes at least two adjacent subpixels. The subpixels in each pixel correspond to backlight lamps in different colors respectively. The display substrate further includes a plurality of light-shielding structures each corresponding to one of the subpixels and configured to adjust a light transmission rate of the subpixel.

Alternatively, each light-shielding structure includes at least two light-shielding plates which have different light transmission rates and which are selected so as to adjust the light transmission rate of the subpixel.

Alternatively, each light-shielding structure includes at least one light-shielding plate which is fully nontransparent and which is moved so as to adjust the light transmission rate of the subpixel.

Alternatively, a driving electrode is arranged on the light-shielding plate and configured to drive the light-shielding plate to move in accordance with a control signal applied to the driving electrode.

Alternatively, the control signal includes a current, and a movement direction of the light-shielding plate depends on a direction of the current.

Alternatively, the control signal includes a voltage, and a movement distance of the light-shielding plate depends on a value of the voltage.

Alternatively, the light-shielding structure includes N light-shielding plates, where N is a positive integer greater than or equal to 2. The light-shielding plates are moved sequentially, and when an $n^{th}$ light-shielding plate is moved to an extreme position, an $(n+1)^{th}$ light-shielding plate starts to be moved, where n is a positive integer greater than or equal to 1 and less than or equal to N−1.

Alternatively, the display substrate further includes a position sensor cooperating with the light-shielding plates and configured to determine a position of each light-shielding plate.

Alternatively, the display substrate further includes a cavity arranged between two adjacent subpixels and configured to accommodate therein the light-shielding plate.

Alternatively, the light-shielding structure includes at least two light-shielding plates which are accommodated within the cavity in a laminated manner.

Alternatively, a lubrication structure is arranged between any two adjacent light-shielding plates accommodated within the cavity in a laminated manner and configured to reduce friction between the two adjacent light-shielding plates.

Alternatively, the lubrication structure is a gas lubrication layer or a liquid lubrication layer.

Alternatively, the lubrication structure is a gas lubrication layer, and a gas in the gas lubrication layer is $N_2$.

Alternatively, the light-shielding plate and the cavity are each made of a silicon material.

According to the display substrate in the embodiments of the present disclosure, the subpixels in each pixel correspond to the backlight lamps in different colors, and the light transmission rate of each subpixel may be adjusted through the light-shielding structure, so as to adjust the quantity of light in different colors passing through the pixels, and enable the pixels to display different colors. As a result, it is able for a display device to achieve the color display without any color filter substrate, thereby to reduce the power consumption of the display device.

In another aspect, the present disclosure provides in some embodiments a display device including the above-mentioned display substrate.

Alternatively, the display device further includes a control unit and a driving unit cooperating with the light-shielding structures. The control unit is configured to output control signals, and the driving unit is configured to control the movement of each light-shielding structure in accordance with the control signal.

Alternatively, the driving unit includes gate lines and data lines crossing each other, second regions defined by any two adjacent gate lines and any two adjacent lines each correspond to the first region which serves as the subpixel, a thin film transistor (TFT) is arranged at each second region, a source electrode of the TFT is electrically connected to the data line, a gate electrode of the TFT is electrically connected to the gate line, and a drain electrode of the TFT is electrically connected to a driving electrode on a light-shielding plate so as to apply a voltage and a current to the driving electrode. The control unit includes a source driver circuit electrically connected to the data lines and configured to input signals into the data lines, and a gate driver circuit electrically connected to the gate lines and configured to input signals into the gate lines.

Alternatively, the display device further includes a plurality of backlight lamps each corresponding to one of the subpixels, and the control unit further includes a backlight lamp controlling circuit configured to control a turn-on and turn-off of the backlight lamp.

According to the embodiments of the present disclosure, the display device includes the above-mentioned display substrate, so it has the beneficial effects identical to the display substrate, and the description thereof is omitted herein.

In yet another aspect, the present disclosure provides in some embodiments a method for driving the above-mentioned display substrate, including a step of controlling a movement of each light-shielding structure, so as to adjust a light transmission rate of each subpixel.

Alternatively, the step of controlling the movement of each light-shielding structure includes applying a voltage and a current to a driving electrode on each light-shielding plate, so as to control a movement distance and a movement direction of the light-shielding plate.

According to the method in the embodiments of the present disclosure, the method includes controlling the movement of each light-shielding structure, so as to adjust the light transmission rate of each subpixel, thereby to adjust the quantity of light in different colors passing through the pixels, and enable the pixels to display different colors. As a result, it is able for the display device to achieve the color display without any color filter substrate, thereby to reduce the power consumption of the display device.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

REFERENCE SIGN LIST

Figure 1:
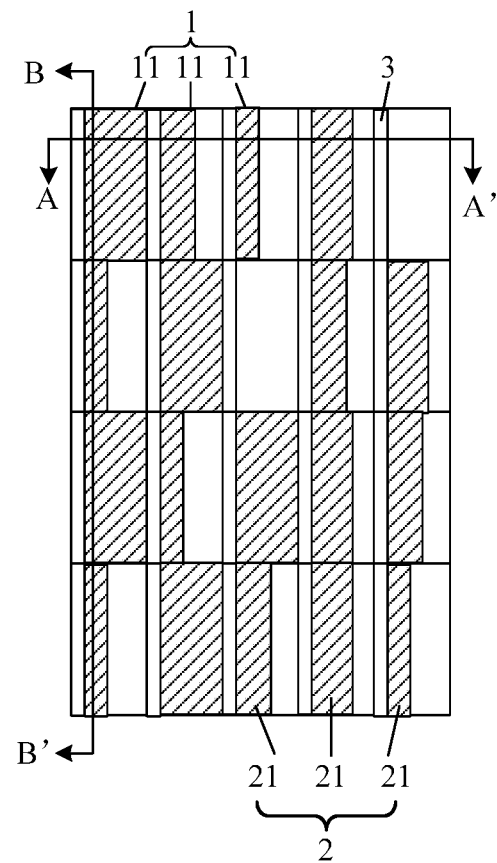
FIG. 1 is a plan view of a display substrate according to some embodiments of the present disclosure.

1 pixel
11 subpixel
2 light-shielding structure
21 light-shielding plate
211 driving electrode
3 cavity
212 position sensor
4 lubrication structure

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 2:
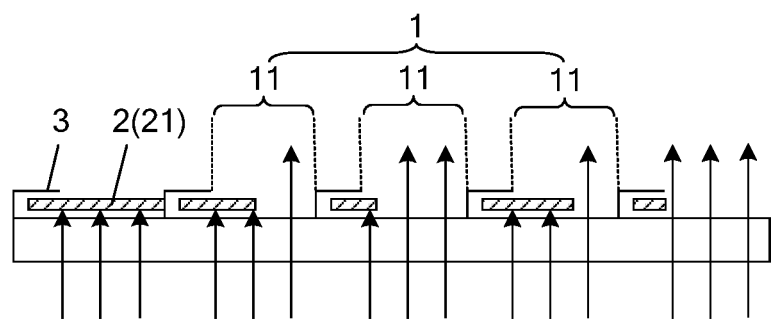
FIG. 2 is a sectional view of the display substrate along line A-A' in FIG. 1.
Figure 3:
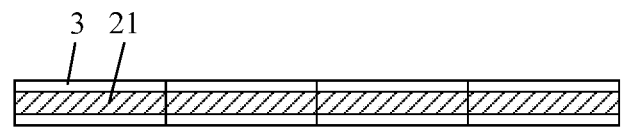
FIG. 3 is a sectional view of the display substrate along line B-B' in FIG. 1.

The present disclosure provides in some embodiments a display substrate which, as shown in FIGS. 1, 2 and 3, includes a plurality of first transparent regions arranged in an array form. Each first transparent region serves as a subpixel 11, and a pixel 1 includes at least two adjacent subpixels 11. The subpixels 11 in each pixel 1 correspond to backlight lamps in different colors respectively. The display substrate further includes a plurality of light-shielding structures 2 each corresponding to one of the subpixels 11 and configured to adjust a light transmission rate of the subpixel 11.

Figure 8:
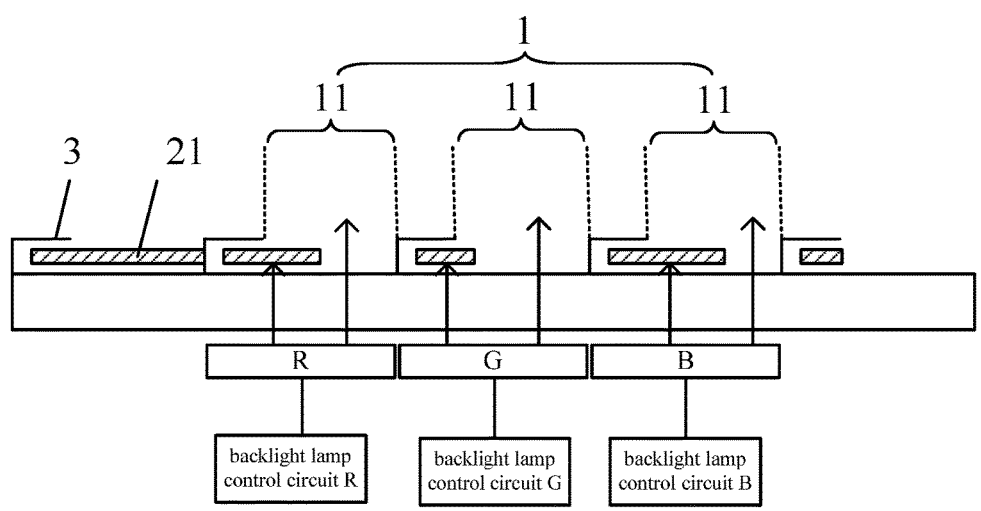
FIG. 8 is a schematic view showing an arrangement of subpixels, backlight lamps and a backlight module according to some embodiments of the present disclosure.

As shown in FIG. 8, each pixel 1 includes three adjacent subpixels 11 corresponding to a red backlight lamp R, a green backlight lamp G and a blue backlight lamp B respectively.

It should be appreciated that, the display substrate includes a base substrate. The base substrate may be a transparent substrate or a nontransparent substrate in some embodiments of the present disclosure. When the base substrate is a transparent substrate, the subpixels 11 may be via-holes or blind holes formed in the transparent substrate, or transparent regions arranged in an array form on the transparent substrate may be selected directly as the subpixels 11, without forming any holes in the transparent substrate. When the base substrate is a nontransparent substrate, the subpixels 11 may be via-holes formed in the nontransparent substrate.

The light-shielding structure 2 may be provided in various forms, and for ease of understanding, two of them will be described hereinafter.

Figure 4:
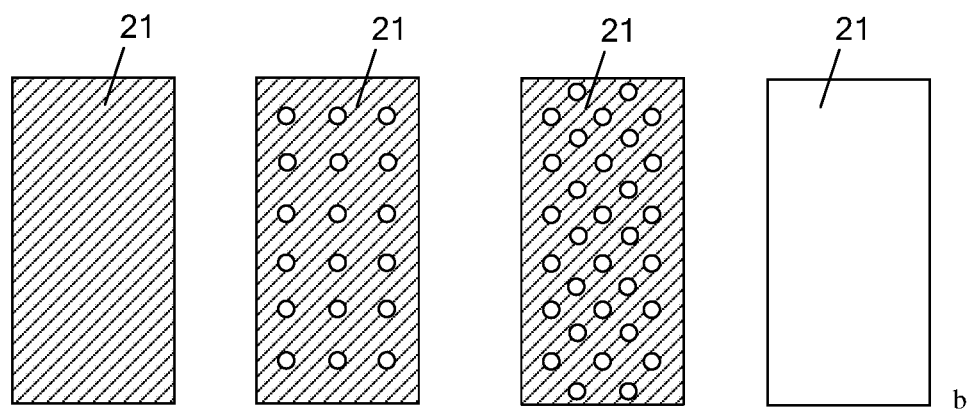
FIG. 4 is a plan view showing four light-shielding plates of one light-shielding structure according to some embodiments of the present disclosure.

As shown in FIG. 4, each light-shielding structure 2 includes at least two light-shielding plates 21 which have different light-transmission rates and which are selected so as to adjust the light-transmission rate of the subpixel 11. Here, the adjustment of the light transmission rate of the subpixel 11 through the light-shielding structure 2 is limited by the number of the light-shielding plates 21. The more the light-shielding plates 21, the more flexible the adjustment of the light transmission rate of the subpixel 11 may be, while the light-shielding structure 2 may be more complex.

As shown in FIG. 2, each light-shielding structure 2 includes at least one light-shielding plate 21 which is fully nontransparent and which is moved so as to adjust the light transmission rate of the subpixel 11. Here, it is able for the light-shielding structure 2, even with a simple structure, to flexibly adjust the light transmission rate of the subpixel 11. In the following descriptions, unless otherwise specified, the light-shielding structure 2 in FIG. 2, i.e., that including fully nontransparent light-shielding plates 21, may be adopted.

It should be appreciated that, the light-shielding plate 21 may be arranged above or below the subpixel 11, as long as it may be used to adjust the light transmission rate of the subpixel 11.

The structures and the number of the light-shielding plates 21 included in the light-shielding structure 2 in FIG. 2 will be described hereinafter.

Figure 5:
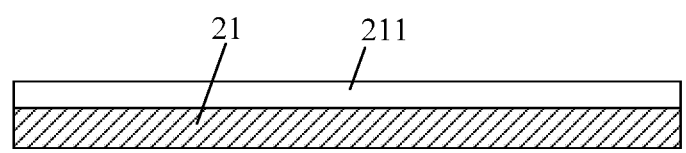
FIG. 5 is a sectional view of a light-shielding plate of another light-shielding structure according to some embodiments of the present disclosure.

As shown in FIG. 5, a driving electrode 211 is arranged on the light-shielding plate 21, so as to drive the light-shielding plate 21 to move in accordance with a control signal applied to the driving electrode 211. For example, the control signal may include a current, and a movement direction of the light-shielding plate 21 depends on a direction of the current. The control signal may further include a voltage, and a movement distance of the light-shielding plate 21 depends on a value of the voltage. As a result, it is able to accurately adjust the movement direction or movement distance of the light-shielding plate 21 by adjusting the direction of the current or the value of the voltage applied to the driving electrode 211, thereby to drive the light-shielding plate 21, and thereby drive the display substrate, in a simpler manner.

It should be appreciated that, a corresponding program is stored in a control unit by which the control signal is applied to the driving electrode 211, thereby to make the driving electrode 211 to drive the light-shielding plate 21 to move. A relationship between the direction of the current applied to the driving electrode 211 and the movement direction of the light-shielding plate 21 has been defined in the program. The directions of the current merely include a positive direction and a negative direction, and movement directions of the light-shielding plate 21 correspond to the positive direction and the negative direction of the current respectively. In addition, a function relationship between the voltage applied to the driving electrode 211 and the movement distance of the light-shielding plate 21 has also been defined in the program. This function relationship is a simple, linear relationship, i.e., when the voltage increases, the movement distance of the light-shielding plate 21 increases accordingly, and vice versa.

For example, the light-shielding structure 2 may include N light-shielding plates 21, where N is a positive integer greater than or equal to 2. When adjusting the light transmission rate of the subpixel 11, the light-shielding plates 21 are moved sequentially. When an $n^{th}$ light-shielding plate has been moved to an extreme position, an $(n+1)^{th}$ light-shielding plate starts to be moved, where n is a positive integer greater than or equal to 1 and less than or equal to N−1. In this way, it is able for the light-shielding structure 2 to adjust the light transmission rate of the subpixel 11 in a more flexible and accurate manner.

Figure 9:
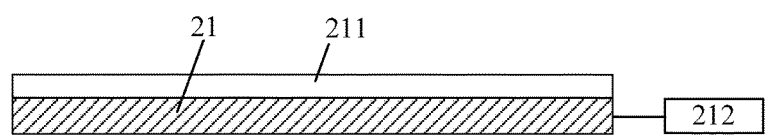
FIG. 9 is a schematic view showing an arrangement of a light-shielding plate, a driving electrode and a position sensor according to some embodiments of the present disclosure.

In addition, in some embodiments of the present disclosure, the display substrate further includes a position sensor 212 cooperating with each light-shielding plate 21. The position sensor 212 is configured to determine a position of each light-shielding plate 21, so as to determine a movement direction and a movement distance of the light-shielding plate 21 when it is to be moved to a next position. When the driving electrode 211 is arranged on the light-shielding plate 21, the position sensor 212 may determine the position of each light-shielding plate 21. In this way, it is able to determine the direction of the current and the value of the voltage to be applied to the driving electrode 211 and desired for the movement of the light-shielding plate 21 to the next position. FIG. 9 shows the arrangement of the light-shielding plate 21 and the position sensor 212.

Figure 6:
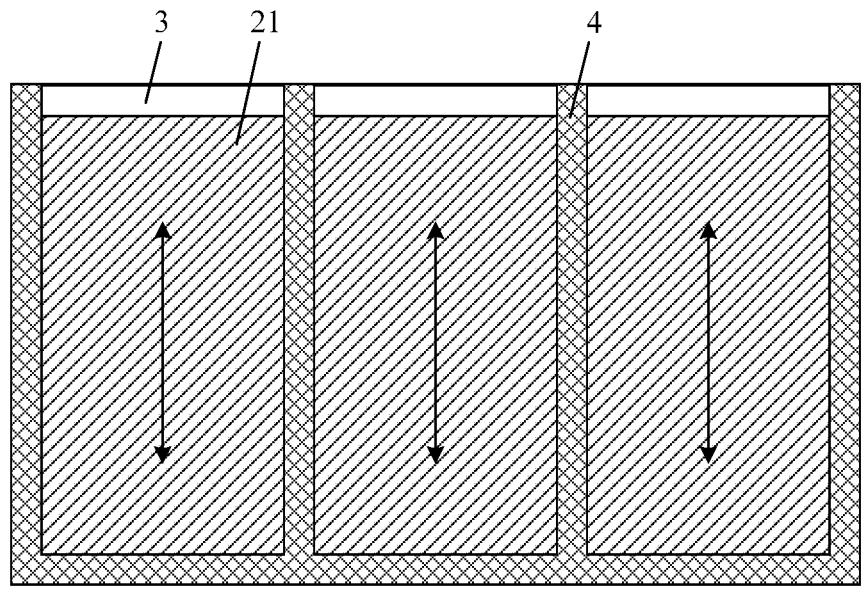
FIG. 6 is a schematic view showing a position relationship between subpixels and cavities according to some embodiments of the present disclosure.
Figure 7:
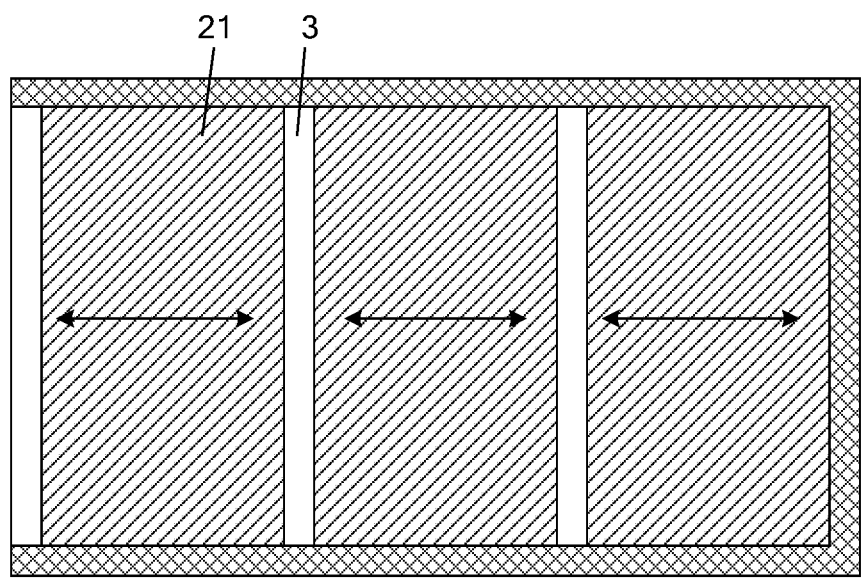
FIG. 7 is a schematic view showing another position relationship between subpixels and cavities according to some embodiments of the present disclosure.

Alternatively, as shown in FIGS. 2, 3 and 6, the display substrate further includes a cavity 3 arranged between two adjacent subpixels 11 and configured to accommodate therein the light-shielding plate 21. For example, the cavity 3 may be at least arranged at one of an upper side, a lower side, a left side and a right side of each subpixel 11. When the cavity 3 is arranged at different positions, the movement directions of the light-shielding plate 21 accommodated in the cavity 3 may be different too. For example, when the cavity 3 is arranged at the upper or lower side of each subpixel 11, the light-shielding plate 21 may be moved up and down and when the cavity 3 is arranged at the left or right side of each subpixel 11, the light-shielding plate 21 may be moved left and right. Alternatively, in the embodiments of the present disclosure, all the cavities 3 may be arranged at an identical side of the respective subpixels 11, so as to move the light-shielding plates 21 in an identical direction, thereby to drive the light-shielding plates 21, and thereby drive the display substrate, in a simpler manner. For example, as shown in FIG. 6, the cavity 6 may be arranged at the upper side of each subpixel 11 and the light-shielding plate 21 may be moved up and down (i.e., in a direction as shown by the double-headed arrow in FIG. 6), or as shown in FIG. 7, the cavity 6 may be arranged at the left side of each subpixel 11 and the light-shielding plate 21 may be moved left and right (e.g., in a direction as shown by the double-headed arrow in FIG. 7).

Further, when the light-shielding structure 2 includes at least two light-shielding plates 21, the light-shielding plates 21 may be accommodated in the cavity 3 in a laminated manner, so as to minimize a size of the cavity 3 in a plane parallel to the base substrate and provide more subpixels 11 on the display substrate, thereby to improve an aperture ratio and a resolution of the display device.

Further, a lubrication structure 4 is arranged between any two adjacent light-shielding plates 21 accommodated within the cavity 3 in a laminated manner, and configured to reduce friction between the two adjacent light-shielding plates 21. For example, the lubrication structure 4 may be a gas lubrication layer or a liquid lubrication layer. Alternatively, the lubrication structure is a gas lubrication layer, and a gas in the gas lubrication layer is $N_2$. In this way, it is able to prevent the display substrate from being polluted by the lubrication structure 4, thereby to prevent the display effect of the display substrate from being adversely affected.

In addition, in some embodiments of the present disclosure, the light-shielding plate 21 and the cavity 3 may be manufactured by a Micro-Electro-Mechanical System (MEMS). Silicon has good mechanical and electrical properties. In addition, its strength, hardness and Young's modulus are equivalent to Fe, its density is similar to Al, and its thermal conductivity is close to Mo and W. Hence, alternatively, the light-shielding plate 21 and the cavity 3 may be made of a silicon material.

According to the display substrate in the embodiments of the present disclosure, the subpixels in each pixel correspond to the backlight lamps in different colors, and the light transmission rate of each subpixel may be adjusted through the light-shielding structure, so as to adjust the quantity of light in different colors passing through the pixels, and enable the pixels to display different colors. As a result, it is able for a display device to achieve the color display without any color filter substrate, thereby to reduce the power consumption of the display device.

The present disclosure further provides in some embodiments a display device including the above-mentioned display substrate.

The display device further includes a control unit and a driving unit cooperating with the light-shielding structures 2. The control unit is configured to output a control signal, and the driving unit is configured to control the movement of each light-shielding structure 2 in accordance with the control signal.

Figure 10:
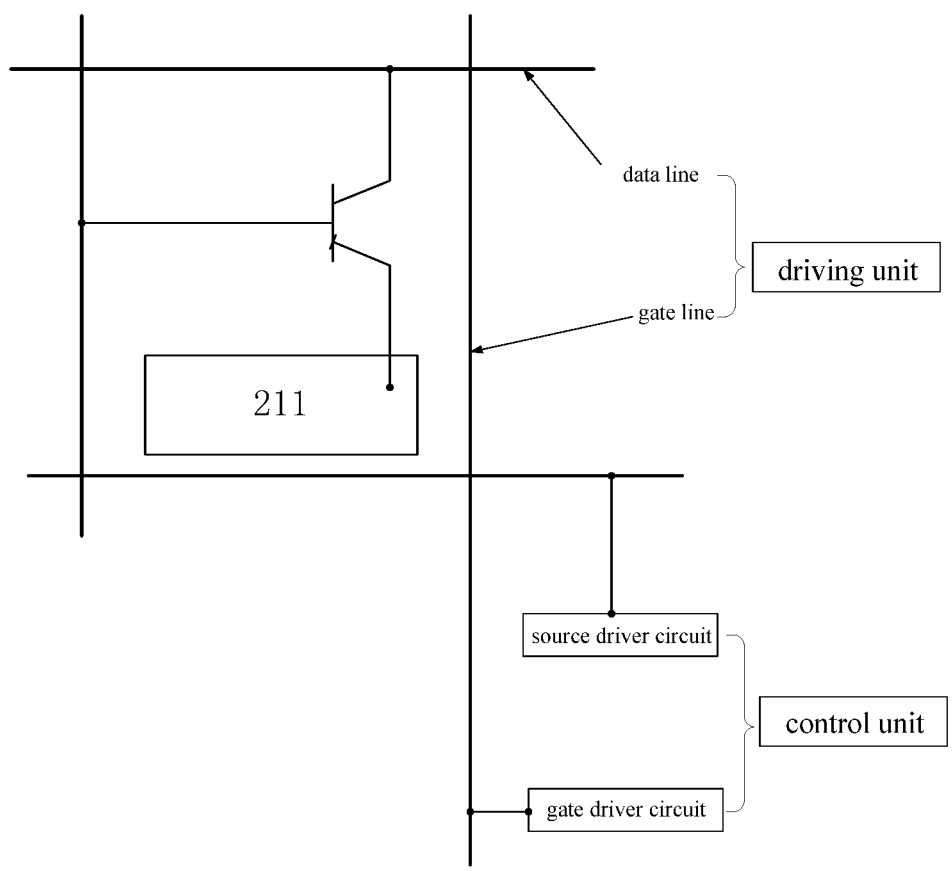
FIG. 10 is a schematic view showing an arrangement of a driving unit, a control unit, a TFT and a driving electrode according to some embodiments of the present disclosure.

For example, when the light-shielding structure 2 includes at least one light-shielding plate 21 which is fully nontransparent and on which the driving electrode 211 is arranged, the driving unit includes gate lines and data lines crossing each other. Second regions defined by any two adjacent gate lines and any two adjacent data lines each correspond to a first region which serves as a subpixel 11, and a TFT is arranged at each second region. A source electrode of the TFT is electrically connected to the data line, a gate electrode of the TFT is electrically connected to the gate line, and a drain electrode of the TFT is electrically connected to the driving electrode 211 on the light-shielding plate 21 so as to apply a voltage and a current to the driving electrode 211, thereby to drive the light-shielding plate 21 to move and adjust the light transmission rate of the subpixel 11. The control unit includes a source driver circuit electrically connected to the data lines and configured to input signals into the data lines, and a gate driver circuit electrically connected to the gate lines and configured to input signals into the gate lines. FIG. 10 shows the arrangement of the driving unit, the control unit, the TFT and the driving electrode.

Two arrangement modes for the gate lines, the data lines and the TFTs in some embodiments of the present disclosure will be described hereinafter.

In a first arrangement mode, the gate lines, the data lines and the TFTs may be arranged on the display substrate, especially at regions between any adjacent two subpixels 11 on the display substrate. At this time, each second region defined by the gate lines and the data lines coincides with a first region and serves as the subpixel 11.

In a second arrangement mode, the gate lines, the data lines and the TFTs are arranged on a further substrate arranged opposite to the display substrate, and the drain electrode of each TFT is electrically connected to the driving electrode 211 on the light-shielding plate 21 through a conductive structure such as a conductive microsphere.

When the gate lines, the data lines and the TFTs are arranged in the first arrangement mode, the display device may be of a simpler structure. In addition, the drain electrode of the TFT and the driving electrode 211 are located on an identical substrate, so they may be electrically connected to each other directly, or through a via-hole filled with a conductive material. In this way, it is able to achieve a better electrical connection between the drain electrode of the TFT and the driving electrode 211. Alternatively, in some embodiments of the present disclosure, the gate lines, the data lines and the TFTs may be arranged in the first arrangement mode.

In addition, the display device further includes a black matrix configured to shield the gate lines, the data lines and the TFTs, so as to prevent them from being viewed by human eyes, thereby to improve the appearance. For example, when the gate lines, the data lines and the TFTs are arranged in the first arrangement mode, the black matrix may cover the gate lines, the data lines and the TFTs, when they are arranged in the second arrangement mode, the black matrix may be arranged at a position on the further substrate corresponding to the gate lines, the data lines and the TFTs on the display substrate.

The display device further includes a plurality of backlight lamps each corresponding to one of the subpixels 11, and the control unit further includes a backlight lamp control circuit configured to control a turn-on and turn-off of each backlight lamp. For example, as shown in FIG. 8, the three subpixels 11 in the pixel 1 correspond to a red backlight lamp R, a green backlight lamp G and a blue backlight lamp B respectively. The red backlight lamp R includes a backlight lamp control circuit R, the green backlight lamp G includes a backlight lamp control circuit G, and the blue backlight lamp B includes a backlight lamp control circuit B.

During the display procedure of the display device, the backlight lamps in different colors may be turned on simultaneously or at different time points. When the backlight lamps in different colors are turned on simultaneously, the colors of the subpixels 11 in each pixel 1 may be mixed in a space-based mode, and when the backlight lamps in different colors are turned on at different time points, the colors of the subpixels 11 in each pixel 1 may be mixed in a time-based mode.

Alternatively, in some embodiments of the present disclosure, the backlight lamps in different colors may be turned on at different time points, and then the colors of the subpixels 11 in each pixel 1 may be mixed in a time-based mode, so as to reduce the power consumption of the display device. For example, when the backlight lamps in a certain color are turned on, the subpixels 11 corresponding to the backlight lamps may be enabled too. At this time, it is able to adjust the position of each light-shielding plate 21 in accordance with the light transmission rate desired for each subpixel 11. The subpixels 11 corresponding to the backlight lamps in the other colors may be disenabled.

According to the display device in the embodiments of the present disclosure, the display device includes the above-mentioned display substrate, so it is able to achieve the color display of the display device without any color filter substrate, thereby to reduce the power consumption of the display device.

In addition, in the related art, the quantity of the light transmitted from the display device depends on the cooperation of a liquid crystal layer and a polarizer. However, in some embodiments of the present disclosure, it is able to adjust the light transmission rate of the subpixel merely through the light-shielding structure. In other words, no liquid crystal layer is required for the display device in the embodiments of the present disclosure, so it is able to reduce the production cost.

The present disclosure further provides in some embodiments a method for driving the above-mentioned display substrate, including a step of controlling the movement of each light-shielding structure 2, so as to adjust the light transmission rate of each subpixel 11. How to adjust the light transmission rate of each subpixel 11 has been described hereinabove, and thus will not be particularly defined herein.

As mentioned above, the light-shielding structure 2 may be of various forms, so the driving method may vary with the forms of the light-shielding structure 2. For example, when the light-shielding structure 2 includes at least one light-shielding plate 21 which is fully nontransparent and on which the driving electrode 211 is arranged, the step of controlling the movement of each light-shielding structure 2 includes applying a voltage and a current to the driving electrode 211 on each light-shielding plate 21, so as to control the movement distance and the movement direction of the light-shielding plate 21.

According to the method in the embodiments of the present disclosure, the method includes controlling the movement of each light-shielding structure, so as to adjust the light transmission rate of each subpixel, thereby to adjust the quantity of light in different colors passing through the pixels, and enable the pixels to display different colors. As a result, it is able for the display device to achieve the color display without any color filter substrate, thereby to reduce the power consumption of the display device.

Through the above descriptions, it may be apparent to a person skilled in the art that the present disclosure may be implemented by hardware, or by software as well as necessary common hardware, and the latter will be better. Based on this understanding, the technical solutions of the present disclosure, or a portion of the technical solutions contributing to the related art may appear in the form of software products, which may be stored in a computer-readable storage medium, e.g., a floppy disk, a hard disk or an optical disk, and which may include several instructions so as to enable a computer (e.g., a personal computer, a server or a network device) to execute the methods according to the embodiments of the present disclosure.

The above are merely the preferred embodiments of the present disclosure. It should be appreciated that, a person skilled in the art may make further modifications and improvements without departing from the spirit of the present disclosure, and these modifications and improvements shall also fall within the scope of the present disclosure.

What is claimed is:

1. A display substrate comprising:
    a plurality of first transparent regions arranged in an array form, wherein each of the plurality of first transparent regions serves as a subpixel, wherein a pixel of the display substrate comprises at least two adjacent ones of the subpixels, and wherein the subpixels in each pixel of the display substrate correspond to a plurality of backlight lamps in different colors respectively;
    a plurality of light-shielding structures, each of which corresponding to one of the subpixels, wherein the plurality of light-shielding structures are configured to respectively adjust light transmission rates of light beams in different colors, which are emitted by the plurality of backlight lamps in different colors, and wherein the plurality of light-shielding structures and the plurality of backlight lamps of different colors are in a one-to-one correspondence,
    wherein each of the plurality of light-shielding structures comprises at least two light-shielding plates, which have different light transmission rates and are selected to adjust the light transmission rate of the corresponding one of the subpixels,
    wherein the display substrate further comprises a cavity arranged between two adjacent ones of the subpixels and configured to accommodate therein a corresponding one of the light-shielding plates, and
    wherein two of the light-shielding plates are disposed within the cavity in a laminated manner; and
    a lubrication structure arranged between any two adjacent ones of the light-shielding plates accommodated within the cavity in a laminated manner and configured to reduce friction between the two adjacent ones of the light-shielding plates.

2. The display substrate according to claim 1, wherein each of the plurality of light-shielding structures comprises at least one light-shielding plate, which is fully nontransparent and is moved to adjust the light transmission rate of the corresponding one of the subpixels.

3. The display substrate according to claim 2, wherein a driving electrode is arranged on one of a plurality of light-shielding plates and is configured to drive the one of the light-shielding plates to move in accordance with a control signal applied to the driving electrode.

4. The display substrate according to claim 3, wherein:
    the control signal comprises a current; and
    a movement direction of the one of the light-shielding plates depends on a direction of the current.

5. The display substrate according to claim 4, wherein:
    the control signal comprises a voltage; and
    a movement distance of the one of the light-shielding plates depends on a value of the voltage.

6. The display substrate according to claim 2, wherein:
    one of the plurality of light-shielding structures comprises N light-shielding plates, where N is a positive integer greater than or equal to 2;
    the N light-shielding plates are moved sequentially; and
    when an nth one of the N light-shielding plates is moved to an extreme position, an (n+1)th one of the N light-shielding plates starts to be moved, where n is a positive integer greater than or equal to 1 and less than or equal to N−1.

7. The display substrate according to claim 2, further comprising a position sensor cooperating with the light-shielding plates and configured to determine a position of each of the light-shielding plates.

8. The display substrate according to claim 1, wherein the lubrication structure is a gas lubrication layer or a liquid lubrication layer.

9. The display substrate according to claim 8, wherein:
    the lubrication structure is a gas lubrication layer; and
    a gas in the gas lubrication layer is $N_2$ (Nitrogen).

10. The display substrate according to claim 1, wherein the corresponding one of the light-shielding plates accommodated in the cavity and the cavity each comprises a silicon material.

11. A display device comprising a display substrate, wherein the display substrate comprises:
    a plurality of first transparent regions arranged in an array form, wherein each of the plurality of first transparent regions serves as a subpixel, wherein a pixel of the display substrate comprises at least two adjacent ones of the subpixels, and wherein the subpixels in each pixel correspond to a plurality of backlight lamps in different colors respectively;
    a plurality of light-shielding structures, each of which corresponding to one of the subpixels, wherein the plurality of light-shielding structures are configured to respectively adjust light transmission rates of light beams in different colors, which are emitted by the plurality of backlight lamps in different colors, and wherein the plurality of light-shielding structures and the plurality of backlight lamps of different colors are in a one-to-one correspondence, wherein each of the plurality of light-shielding structures comprises at least two light-shielding plates, which have different light transmission rates and are selected to adjust the light transmission rate of the corresponding one of the subpixels, wherein the display substrate further comprises a cavity arranged between two adjacent ones of the subpixels and configured to accommodate therein a corresponding one of the light-shielding plates, and wherein two of the light-shielding plates are disposed within the cavity in a laminated manner; and a lubrication structure arranged between any two adjacent ones of the light-shielding plates accommodated within the cavity in a laminated manner and configured to reduce friction between the two adjacent ones of the light-shielding plates.

12. The display device according to claim 11, further comprising a control unit and a driving unit cooperating with the plurality of light-shielding structures, wherein:

the control unit is configured to output control signals; and the driving unit is configured to control a movement of each of the plurality of light-shielding structures in accordance with the control signals.

13. The display device according to claim 12, wherein:

the driving unit comprises gate lines and data lines crossing each other;

second regions defined by any two adjacent ones of the gate lines and any two adjacent ones of the data lines each correspond to one of the first transparent regions which serves as one of the subpixels;

a thin film transistor (TFT) is arranged at each of the second regions;

a source electrode of the TFT is electrically connected to one of the data lines;

a gate electrode of the TFT is electrically connected to one of the gate lines;

a drain electrode of the TFT is electrically connected to a driving electrode on a corresponding one of the light-shielding plates of a corresponding one of the plurality of light-shielding structures to apply a voltage and a current to the driving electrode; and the control unit comprises a source driver circuit electrically connected to the data lines and configured to input signals into the data lines, and a gate driver circuit electrically connected to the gate lines and configured to input signals into the gate lines.

14. The display device according to claim 12, wherein the control unit further comprises a backlight lamp controlling circuit configured to control turning on and turning off the plurality of backlight lamps.

15. A method for driving a display substrate, wherein the display substrate comprises a plurality of first transparent regions arranged in an array form and a plurality of light-shielding structures, wherein each of the plurality of first transparent regions serves as a subpixel, wherein a pixel of the display substrate comprises at least two adjacent ones of the subpixels, wherein the subpixels in each pixel of the display substrate correspond to a plurality of backlight lamps in different colors respectively, wherein each of the plurality of light-shielding structures corresponds to one of the subpixels, wherein the plurality of light-shielding structures are configured to respectively adjust light transmission rates of light beams in different colors, which are emitted by the plurality of backlight lamps in different colors, wherein the plurality of light-shielding structures and the plurality of backlight lamps of different colors are in a one-to-one correspondence, wherein each of the plurality of light-shielding structures comprises at least two light-shielding plates, which have different light transmission rates and are selected to adjust the light transmission rate of the corresponding one of the subpixels, wherein the display substrate further comprises cavity arranged between two adjacent ones of the subpixels and configured to accommodate therein a corresponding one of the light-shielding plates, wherein two of the light-shielding plates are disposed within the cavity in a laminated manner, and wherein a lubrication structure is arranged between any two adjacent ones of the light-shielding plates accommodated within the cavity in a laminated manner and configured to reduce friction between the two adjacent ones of the light-shielding plates, the method comprising controlling a movement of each of the plurality of light-shielding structures to adjust a light transmission rate of each subpixel.

16. The method according to claim 15, wherein the controlling of the movement of each of the plurality of light-shielding structures comprises applying a voltage and a current to a driving electrode on each light-shielding plate of the plurality of light-shielding structures to control a movement distance and a movement direction of the light-shielding plates.

* * * * *